United States Patent [19]

Nakano

[11] Patent Number: 4,955,246

[45] Date of Patent: Sep. 11, 1990

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 357,192

[22] Filed: May 26, 1989

[30] Foreign Application Priority Data

May 27, 1988 [JP] Japan ................................. 63-69293

[51] Int. Cl.$^5$ ...................... F16H 15/38; F16C 19/30; F16C 19/48
[52] U.S. Cl. ........................................ 74/200; 74/190; 384/604; 384/608
[58] Field of Search ............. 74/200, 201, 190, 190.5; 384/604, 608

[56] References Cited

U.S. PATENT DOCUMENTS

| | | | |
|---|---|---|---|
| 4,434,675 | 3/1984 | Kraus | 74/200 |
| 4,576,055 | 3/1986 | Kraus | 74/200 |
| 4,702,118 | 10/1987 | Kraus | 74/200 |

FOREIGN PATENT DOCUMENTS

| | | | |
|---|---|---|---|
| 2753812 | 6/1978 | Fed. Rep. of Germany | 384/604 |
| 61-27359 | 2/1986 | Japan | 74/200 |
| 61-119865 | 6/1986 | Japan . | |
| 61-124764 | 6/1986 | Japan | 74/200 |
| 62-2062 | 1/1987 | Japan | 74/200 |
| 62-258254 | 11/1987 | Japan | 74/200 |

Primary Examiner—Allan D. Herrmann
Attorney, Agent, or Firm—Foley & Lardner, Schwartz, Jeffery, Schwaab, Mack, Blumenthal & Evans

[57] ABSTRACT

Needle bearings are interposed between roller supporting members and collars of thrust bearings for traction rollers, respectively. Each thrust bearing is supported on a pivotal portion of a shaft which is in turn supported at its pivot base portion on each roller support member. Each needle bearing includes a plurality of first needles arranged in a circular array concentric with the pivot base portion of each shaft and a plurality of second needles arranged in a part-circular array along the outer periphery of the first needles.

2 Claims, 3 Drawing Sheets

4,955,246

CONTINUOUSLY VARIABLE TRACTION ROLLER TRANSMISSION

BACKGROUND OF THE INVENTION

1. Field of the Invention

The present invention relates to a continuously variable traction roller transmission.

2. Description of the Prior Art

An example of a continuously variable traction roller transmission is disclosed in Japanese Provisional Patent Publication No. 61-119865. The transmission includes two toric traction discs and two traction rollers in frictional engagement with the traction discs. The traction rollers are rotatably supported on pivotal portions of shafts which are in turn supported at pivot base portions on roller support members. The friction rollers pivot about the pivot base portions of the shafts for variously setting the transmission ratio. Thrust ball bearings are interposed between the traction rollers and the roller support members so that the traction rollers are in rolling contact with the roller support members. Slide bearings are further interposed between the collars of the thrust ball bearings and the roller support members.

A disadvantage of the continuously variable traction roller transmission is that upon pivotal movement of the traction rollers a slippage is liable to be caused between the tranction rollers and the traction discs.

SUMMARY OF THE INVENTION

In accordance with the present invention, there is provided a continuously variable traction roller transmission which comprises input and output traction discs having opposite toric surfaces, two traction rollers arranged in engagement with the toric surfaces of the input and output discs for the transmission of movement therebetween, two shafts having pivot base portions and pivotal portions eccentric with the pivot base portions, the traction rollers being rotatably supported on the pivotal portions of the shafts, two roller support members rotatably supporting thereon the pivot base portions of the shafts and having rotatable shaft portions, the roller support members being rotatable about and axially slidable on the rotatable shaft portions, two thrust bearings arranged concentric with the pivotal portions of the shafts and between the traction rollers and the roller support members, respectively, the thrust bearings having collars on the sides of the support members, and two needle bearings interposed between the collars of the thrust bearings and the roller support members, respectively.

The above structure is effective for solving the above noted problem inherent in the prior art device.

It is accordingly an object of the present invention to provide a continuously variable traction roller transmission which can assuredly prevent a slippage between tranction rollers and traction discs upon pivotal movement of the traction rollers.

DESCRIPTION OF THE PREFERRED EMBODIMENT

Figure 2:
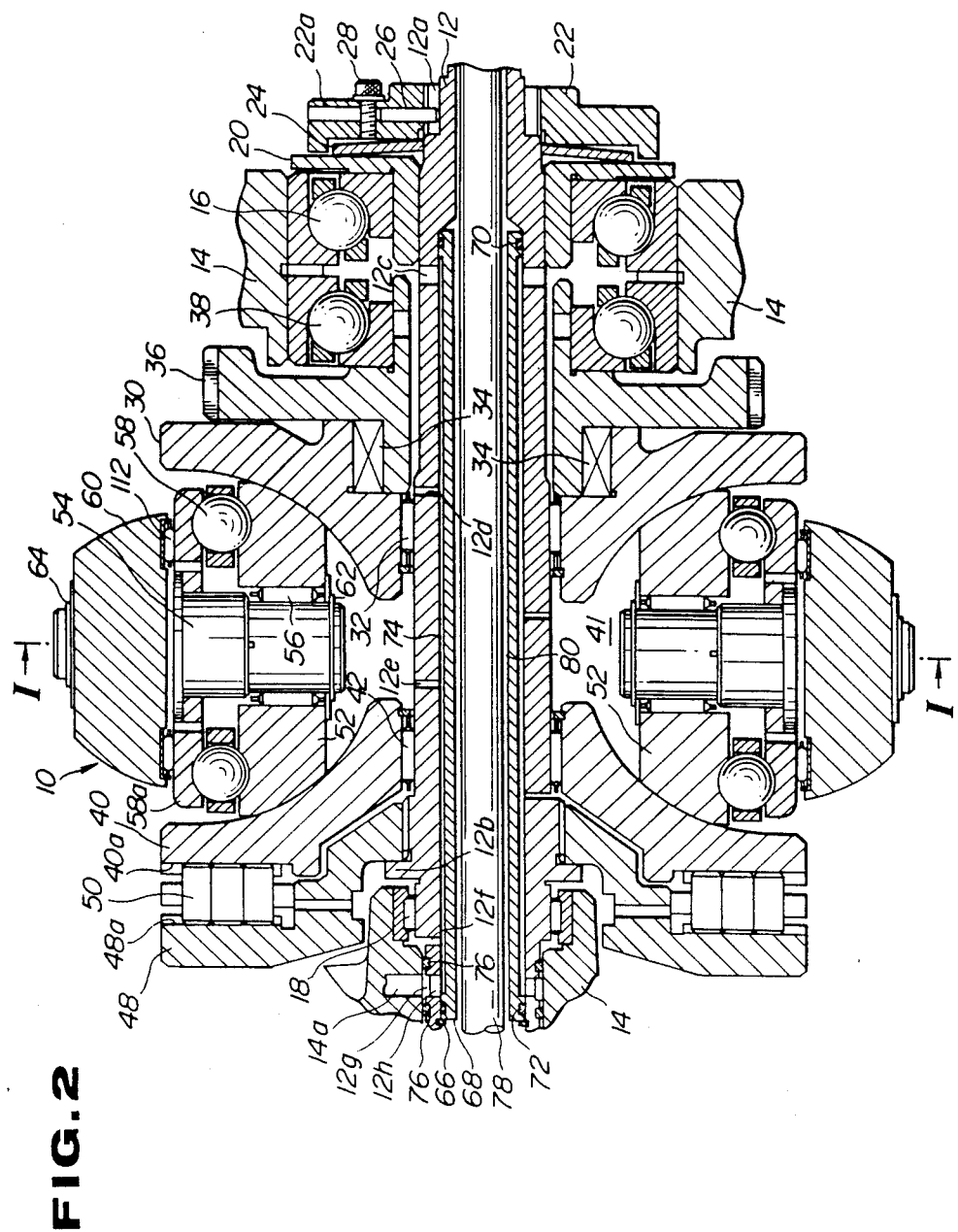
FIG. 2 is a longitudinal sectional view of the continuously variable traction roller transmission of FIG. 1.

Referring first to FIG. 2, a continuously variable traction roller transmission according to an embodiment of the present invention is generally indicated by 10 and includes an input shaft 12 which is rotatably supported on a casing 14 by way of a ball bearing 16 and a needle bearing 18. A spacer 20 is disposed between the input shaft 12 and the ball bearing 16. Disposed between the spacer 20 and a loading nut 22 screwed onto the input shaft 12 is a belleville spring 24 so that a spring force of the belleville spring 24 urges the input shaft 12 righwardly in FIG. 2. The loading nut 22 is prevented from becoming loose by a stopper pin 26 which has an end protruding into a groove 12a of the input shaft 12. The loading nut 22 and the input shaft 12 are respectively formed with a plurality of bores 22a and a plurality of grooves 12a so that fine adjustment of the fixing position of the loading nut 22 can be attained by various combinations of the bores 22a and the grooves 12a. A bolt 28 is screwed into the nut 22 so as to prevent uninteded removal of the stopper pin 26.

A toric output traction disc 30 is rotatably installed on the input shaft 12 by way of a bearing 32. Secured to the output traction disc 30 with two keys 34 is an output gear 36 which is also rotatably supported on the casing 14 by way of a ball bearing 38.

A toric input traction disc 40 is arranged so as to cooperate with the output traction disc 30 to define therebetween a toric cavity 41 of a circular cross section, i.e., the input and output traction discs 40 and 30 have opposite toric surfaces defining therebetwen the toric cavity 41. The input traction disc 40 is rotatably and axially slidably supported on the input shaft 12 by way of a bearing 42. A cam flange 48 is disposed on the back side of the input traction disc 40, i.e., on the side opposite to the output traction disc 30. The cam flange 48 is splined to the input shaft 12 and prevented from making excessive leftward movement by an annular projection 12b of the input shaft 12.

Cam rollers 50 are disposed between the input traction disc 40 and the cam flange 48 so as to contact respective cam surfaces 40a and 48a of the input traction disc 40 and the cam flange 48. The cam rollers 50 and the cam surfaces 40a and 48a are constructed and arranged so that relative rotation between the cam flange 48 and the input disc 40 causes a force for urging the input traction disc 48 righwardly in FIG. 2.

Two traction rollers 52 are disposed in the toric cavity 41 in radial symmetry and in engagement with the toric surfaces of the input and output traction discs 40 and 30. The traction rollers 52 are rotatably supported on respective shafts 54 by way of bearings 56. Further, the traction rollers 52 are supported on respective ball bearings 58 which are in turn supported on roller support members 60. Snap rings 62 and 64 are attached to the opposite end portions of each shaft 54 to hold the traction roller 52, ball bearing 58 and roller support member 60 in place.

Disposed within the hollow input shaft 12 and held therewithin by a snap ring 66 is a sleeve 68 which has opposite larger diameter end portions in which O-rings 70 and 72 are installed. By this, a fluid passage 74 is defined between the outer circumferential surface of the sleeve 68 and the inner circumferential surface of the input shaft 12. The input shaft 12 is formed with four radial openings 12c–12f which are axially spaced from each other and communicated with the fluid passage 74. Furthermore, the input shaft 12 is formed with a groove 12g and an opening 12h through which fluid from a bore 14a of the casing 14 is fed into the fluid passage 74. Two seal rings 76 are disposed between the input shaft 12 and the casing 14 to prevent leakage of the groove 12g through the space between the input shaft 12 and the casing 14.

Figure 1:
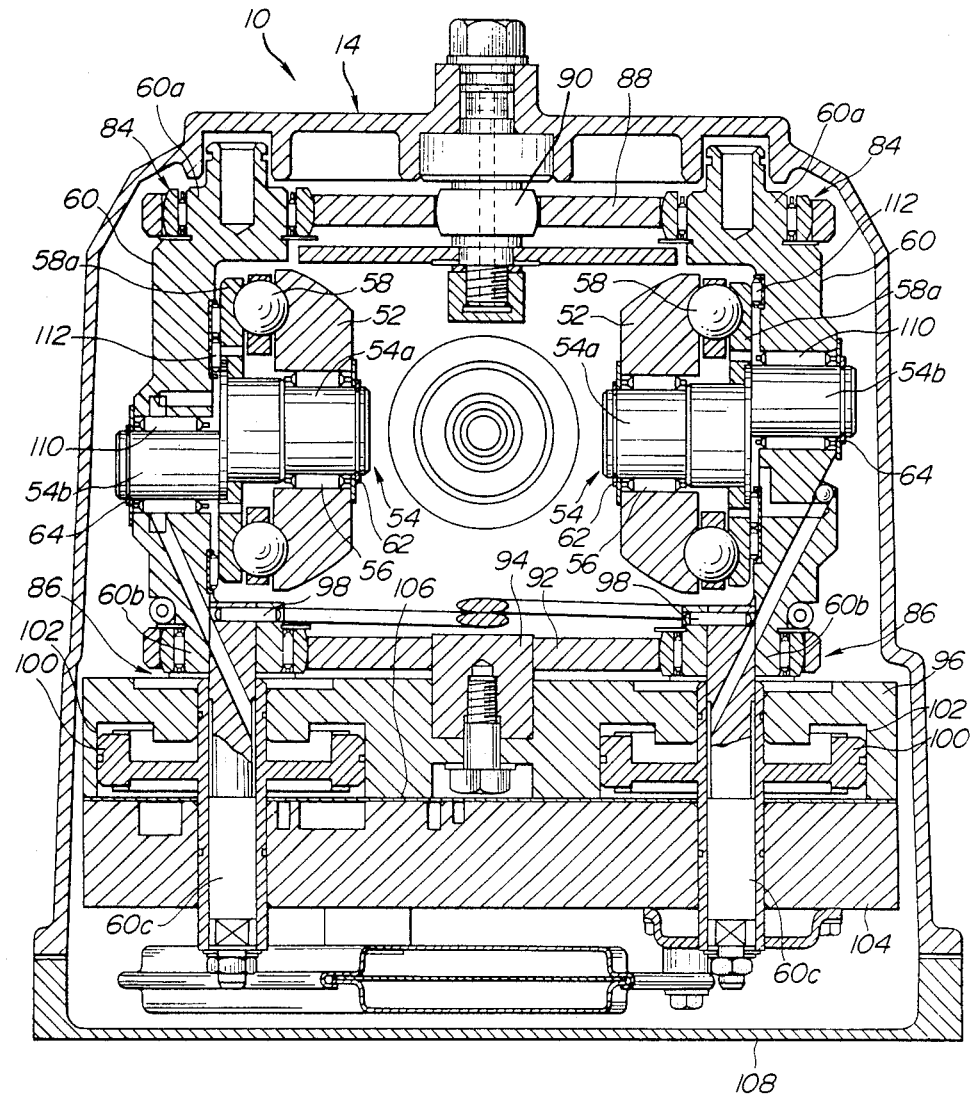
FIG. 1 is a sectional view taken along the line I—I of FIG. 2 and shows a continuously variable traction roller transmission according to an embodiment of the present invention.

Disposed within the sleeve 68 is a drive shaft 78 for an oil pump (see FIG. 1). Formed between the inner circumferential surface of the sleeve 68 and the outer circumferential surface of the drive shaft 78 is a fluid passage 80 through which fluid for controlling the lock-up operation of a torque converter (not shown) is conducted.

Referring additionally to FIG. 1, each roller support member 60 has upper and lower rotatable shaft portions 60a and 60b which are rotatably supported by spherical bearings 84 and 86 in such a manner as to be rotatable and slidable in a vertical direction in FIG. 1. The spherical bearing 84 is held by a first bearing support member 88 which is in turn supported by a first link post 90 which is secured to the casing 14. The other spherical bearing 86 is held by a second bearing support member 92 which is in turn supported by a second link post 94 which is secured to an upper control valve body 96 which is in turn secured to the casing 14. Connected concentrically to the rotatable shaft portion 60b of each roller support member 60 is an extension shaft 60c. The extension shaft 60c is fitted in the hole of the rotatable shaft protion 60b and prevented from rotation and uninteded removal by a pin 98. A piston 100 is provided to the outer periphery of each extension shaft portion 83c. The piston 100 is fitted in a cylinder 102 formed in the upper control valve body 96. A lower control valve body 104 is attached to the lower surface of the upper control valve body 96 by way of a separate plate 106. An oil pan 108 is attached to the casing 14 for receiving therewithin the lower valve body 104, etc.

Figure 3:
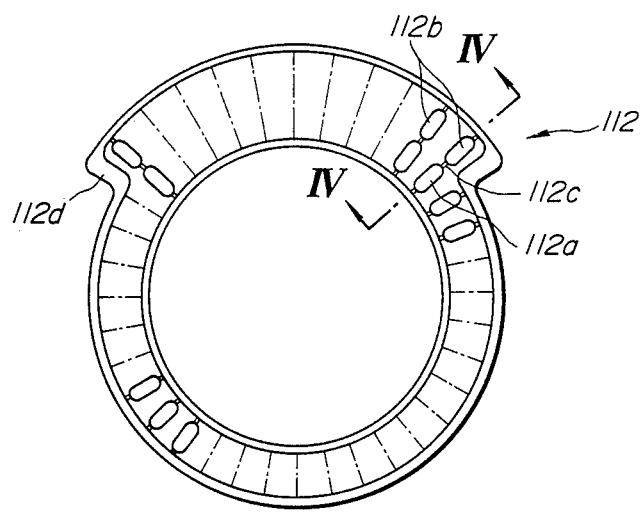
FIG. 3 is an elevational view of a thrust needle bearing employed in the continuously variable traction roller transmission of FIG. 1.
Figure 4:
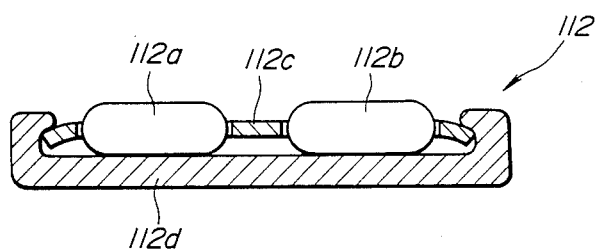
FIG. 4 is a sectional view taken along the line IV—IV of FIG. 3.

The traction rollers 52 are supported on pivotal shaft portions 54a of the shafts 54 by way of the above described bearings 56. The shafts 54 have pivot base shaft portions 54b which are supported on the roller support members 60 by way of bearings 110. The thrust force acting on the traction rollers 52 is sustained by the thrust ball bearings 58. The thrust ball bearings 58 have collars 58a on the side of the roller support members 60. The collars 58a are supported on the roller support members 60 by way of thrust needle bearings 112. Each thrust needle bearing 112, as shown in FIGS. 3 and 4, includes a plurality of first needles 112a arranged in a circular array, a plurality of second needles 112b arranged in an arcuated array or part-circular array along the outer periphery of the first needles 112a and retainer 112c holding the first and second needles 112a and 112b in place relative to each other. The thrust needle bearings 112 further include collars 112d on which the first and second needles 112a and 112b roll. The needle bearing collars 112d are force-fitted in corresponding holes formed in the roller support members 60 and fixedly held therein. The thrust needle bearings 112 are arranged concentric with the respective shafts 54, i.e., arranged in such a way that the circular arrays of the first needles 112a are concentric with the pivot base portions 54b.

The operation of the continuously variable traction roller transmission 10 will now be described. When the input shaft 12 is at a standstill, the belleville spring 24 acts upon the input traction disc 40 to apply thereto an intial thrust.

When the input shaft 12 starts rotating and its speed is increased to a certain value, the cam roller 50 connects the cam flange 48 with the input traction disc 40 thereby rotating the input traction disc 40 and at the same time producing a thrust force proportional to the input torque of the input shaft 12 so that each traction roller 52 are tightly held between the input and output traction discs 40 and 30 without slipage therebetween, thus causing the traction rollers 52 to rotate about the input shaft 12 and transmitting power from the input traction disc 40 to the input traction disc 30.

Referring to FIG. 2, in order to increase the transmission ratio, the right hand roller support member 60 is moved upward whilst the left hand roller support member 60 is moved downward. By this, the direction of force tangentially applied to each traction roller 52 varies, thus causing the roller support members 60 to rotate in the opposite directions about the respective rotational shaft portions 60a and 60b. By this, the traction rollers 52 are caused to pivot about the pivot base portions 54b of the shafts 54, thus reducing the diamter of the joint between each traction roller 52 and the input traction disc 40 whilst on the other hand increasing the diameter of the joint between each traction roller 52 and the output traction disc 30. In order to reduce the transmission ratio, the transmission 10 operates similarly as above except that the roller support members 60 are rotated in the reverse directions about the rotational shaft portions 60a and 60b.

During the above operation for variously setting the transmission ratio, the collars 58a of the thrust bearings 58 are caused to rotate about the pivot base portions 54b of the shafts 54 relative to the roller support members 60, respectively. However, since the thrust needle bearings 112 are disposed between the collars 58a of the thrust bearings 58 and the roller support members 60, the collars 58a are in rolling contact with the roller support members 60. The frictional loss between the collars 58a and the roller support members 60 is thus reduced considerably thereby making it possible to prevent a slippage of the traction rolles 52 relative to the traction discs 30 and 40.

It is revealed according to the present invention that the above noted slippage between the traction rollers and the traction discs results from the frictional loss between the collars of the ball bearings and the roller support members, i.e., the sliding bearings interposed between them cannot act as desired.

It is to be noted that the thrust needle bearings 112 can uniformly sustain the thrust forces which are eccentrically applied thereto from the traction rollers 52 and therefore can effect an efficient bearing action since it consists of the first needles 112a arranged in a complete circular array concentric with the pivot base portion 54b of the shaft 54 and the second needles 112b arranged in an arcuate or part-circular array around the outer periphery of the first needles 112a.

What is claimed is:

1. A continuously variable traction roller transmission comprising:

input and output traction discs having opposite toric surfaces;

two traction rollers arranged in engagement with said toric surfaces of said input and output discs for the transmission of movement therebetween;

two shafts having pivot base portions and pivotal portions eccentric with said pivot base portions;

said traction rollers being rotatably supported on said pivotal portions of said shafts;

two roller support members rotatably supporting thereon said pivot base portions of said shafts and having rotatable shaft portions;

said roller support members being rotatable about and axially slidable on said rotatable shaft portions;

two thrust bearings arranged concentric with said pivotal portions of said shafts and between said traction rollers and said roller support members, respectively;

said thrust bearings having collars on the sides of said roller support members; and two needle bearings interposed between said collars of said thrust bearings and said roller support members, respectively;

said needle bearings being arranged concentrically with the pivot base portions of said shafts.

2. The transmission according to claim 1 wherein each of said needle bearings comprises a plurality of first needles arranged in a circular array concentric with said pivot base portions of said shafts and a plurality of second needles arranged in part-circular array along the outer periphery of said first needles.

* * * * *